United States Patent [19]

Maeda

[11] Patent Number: 4,812,998

[45] Date of Patent: Mar. 14, 1989

[54] DISPLAY TERMINAL CONTROL SYSTEM

[75] Inventor: Satoru Maeda, Kanagawa, Japan

[73] Assignee: Sony Corporation, Tokyo, Japan

[21] Appl. No.: 748,958

[22] Filed: Jun. 26, 1985

[30] Foreign Application Priority Data

Jul. 2, 1984 [JP] Japan ................................ 59-136677

[51] Int. Cl.⁴ ................................................ G06F 15/20

[52] U.S. Cl. .................................... 364/518; 340/723; 340/731; 364/521

[58] Field of Search ................ 364/518, 521; 340/721, 340/750, 747, 703, 723, 731; 358/288, 312, 313; 379/93, 96, 98, 102

[56] References Cited

U.S. PATENT DOCUMENTS

| | | | |
|---|---|---|---|
| Re. 31,200 | 4/1983 | Sukonick et al. | 340/721 |
| 4,028,695 | 6/1977 | Saich | 340/365 VL |
| 4,121,283 | 10/1978 | Walker | 364/200 |
| 4,290,063 | 9/1981 | Traster | 340/723 |
| 4,366,475 | 12/1985 | Kishi et al. | 364/521 |
| 4,509,043 | 4/1985 | Mossaides | 340/750 |
| 4,532,605 | 7/1985 | Waller | 364/900 |
| 4,533,910 | 8/1985 | Sukonick et al. | 364/521 X |
| 4,578,535 | 3/1986 | Simmons | 379/93 |
| 4,591,998 | 5/1986 | Kuperman et al. | 364/521 |
| 4,611,306 | 9/1986 | Crehan et al. | 364/521 |
| 4,620,289 | 10/1986 | Chauvel | 364/521 |
| 4,639,879 | 1/1987 | Chaya | 340/721 |
| 4,646,134 | 2/1987 | Komatsu et al. | 364/521 |
| 4,691,340 | 9/1987 | Maeda et al. | 379/98 X |
| 4,692,757 | 9/1987 | Tsuhara et al. | 340/723 X |
| 4,694,406 | 9/1987 | Shibui et al. | 364/518 |
| 4,700,378 | 10/1987 | Brown | 379/96 |
| 4,716,404 | 12/1987 | Tabata et al. | 340/723 |

*Primary Examiner*—Parshotam S. Lall

*Assistant Examiner*—Edward R. Cosimano

[57] ABSTRACT

A display terminal control system applied to an image information terminal is disclosed, which includes a system control circuit, a display control circuit having a display buffer memory, the operation thereof being managed by the system control circuit, a coupler connected to the system control circuit for coupling the image information terminal to a data center and a keyborard connected to the system control circuit, wherein the keyboard has a multi-image control key which enables a multi-image display for normal image data sequentially supplied from the data center.

7 Claims, 3 Drawing Sheets

DISPLAY TERMINAL CONTROL SYSTEM

BACKGROUND OF THE INVENTION

1. Field of the Invention

This invention relates to a display terminal for a character-image information system such as Videotex.

2. Description of the Prior Art

There have been proposed character-image information systems such as CAPTAIN (character and pattern telephone access information network) system and NAPLPS (North American Presentation Level Protocol Syntax).

FIG. 1 schematically shows an example of such character-image information system. In FIG. 1, reference numeral 10 designates a data center for transmitting a character-image information to a user terminal 30. The data center 10 and the user terminal 30 are coupled with each other through a telephone cable 1, for example, so that the bidirectional data communication can be carried out therebetween.

The user terminal 30 is provided with a microcomputer and this microcomputer comprises a CPU (central processing unit) 31, a ROM (read only memory) 32 which stores a program for controlling the functions of the system such as reception, display, print and transmission or the like and a RAM (random access memory) 33.

Reference numeral 21 designates a MODEM (modulator and demodulator) and this MODEM 21 demodulates a modulated data transmitted from the data center 10 to the user terminal 30 or modulates a signal transmitted from the user terminal 30 to the data center 10. The MODEM 21 is connected through an I/O port 34 to a system bus 35.

Reference numeral 22 designates a keyboard and 23 a printer for making a hard copy of image information. They are connected to the system bus 35 through I/O ports 36 and 37, respectively.

Reference numeral 24 designates a video RAM which stores display data consisting of one page amount (one picture frame amount), 25 a memory controller for forming an address signal and read and write signals of the video RAM 24 and, 26 a CRT (cathode ray tube) or display controller which controls a CRT or monitor 27 to display an image information. They are connected one another and to the system bus 35, respectively, When a desired image information is selected by the keyboard 22, the CPU 31 accepts it so that information request signal is supplied through the I/O port 34 to the MODEM 21 in which it is modulated and thus modulated information request signal is supplied through the telephone cable 1 to the data center 10.

When the data center 10 is supplied with such request signal, the data center 10 modulates the requested image information and transmits the modulated image information to the user terminal 30. In the user terminal 30, the image information is demodulated by the MODEM 21, stored through the I/O port 34 to the RAM 33 and then written in the video RAM 24 in turn.

The memory controller 25 forms a read address signal and a read signal which are in synchronsim with vertical and horizontal scannings. These signals are respectively supplied to the video RAM 24 in a time-division manner with a write signal so that the display data is sequentially read out from the video RAM 24 in synchronism with the vertical and horizontal scannings. The display data read out from the video RAM 24 is decoded to three primary color signals R, G and B by the video controller 26 and they are fed to the monitor 27. Thus the color picture image transmitted from the data center 10 is displayed on the display screen of the monitor 27. When a hard copy request key (not shown) of the keyborad 22 is depressed, the display data is supplied through the I/O port 37 to the printer 23 in which it is printed out on a printing paper. Thus the hard copy of the display data can be made as required.

For example, the CAPTAIN system uses as its format a noraml mode and a multi-image mode to transmit an image data. Further, the multi-image mode includes a center-oriented multi-image mode and a terminal-oriented multi-image mode. In this case, in the terminal-oriented multi-image mode, the user can watch the plurality of images of normal mode as multi-images simultaneously. More particularly, in the picture frame of a screen of the monitor 27, one page is formed by 496 dots x 408 dots as shown in FIG. 2, while in the normal mode, 2 dots each in the horizontal and vertical directions, or 4 dots in total are expressed by the same information as shown by cross-hatched circles in FIG. 2 so that the picture frame of the normal mode becomes equal to the picture frame in which one page is formed of 248 dots×204 dots.

In the multi-image mode, one page is formed of 496 dots×408 dots and one picture frame of the screen is divided into 4 equal parts and then 4 small picture frames #1 to #4 can be displayed as shown in FIG. 3. Also the memory area of the video RAM 24 is divided into 4 equal areas $A_1$ to $A_4$ corresponding to the 4 small picture frames #1 to #4 as shown in FIG. 4.

In the terminal-oriented multi-image mode, the image information or data of each picture frame transmitted from the data center 10 are stored in the areas $A_1$ to $A_4$ of the video RAM 24. When picture frames are sequentially transmitted from the data center 10, the image information is sequentially writted in the areas $A_1$ to $A_4$ of the video RAM 24 in the order of $A_1 \rightarrow A_2 \rightarrow A_3 \rightarrow A_4 \rightarrow A_1 \rightarrow A_2 \ldots$.

Accordingly, on the screen of the monitor 27, each of the 4 small picture frames #1 to #4 displays different display information and is changing its display content as a signal is transmitted from the data center 10.

By the way, in the terminal-oriented multi-image mode, there is the possibility that the user may want to watch any one of the 4 small picture frames #1 to #4 in an unchanged or fixed state. However, such user's request can not be satisfied. On the contrary, the content or data stored in the video RAM 24 is sequentially rewritten by the information transmitted from the data center 10 and thence the desired small picture frame of small picture frames in multi-image mode can not be viewed in an unchanged state.

OBJECTS AND SUMMARY OF THE INVENTION

Accordingly, it is an object of this invention to provide a display terminal control system in which in a terminal-oriented multi-image mode, a desired picture frame of multi-picture frames can be watched in a fixed state.

It is another object of this invention to provide a display terminal control system for use with a character-image information system such as Videotex.

According to one aspect of the present invention, there is provided a display control system applied to an image-information terminal comprising:

system control means;

display control means having a display buffer memory, the operation thereof being managed by said system control means;

coupling means connected to said system control means for coupling said image information terminal to a data center; and a keyboard connected to said system control means, wherein said keyboard has a multi-image control key which enables a multi-image display for a normal image data sequentially supplied from said data center.

These and other objects, features and advantages of the present invention will become apparent from the following detailed description of the preferred embodiment taken in conjunction with the accompanying drawings throughout which like reference numerals designate like elements and parts.

DESCRIPTION OF THE PREFERRED EMBODIMENT

Now, an embodiment of a display terminal control system according to this invention will hereinafter be described in detail with reference to the drawings.

Figure 1:
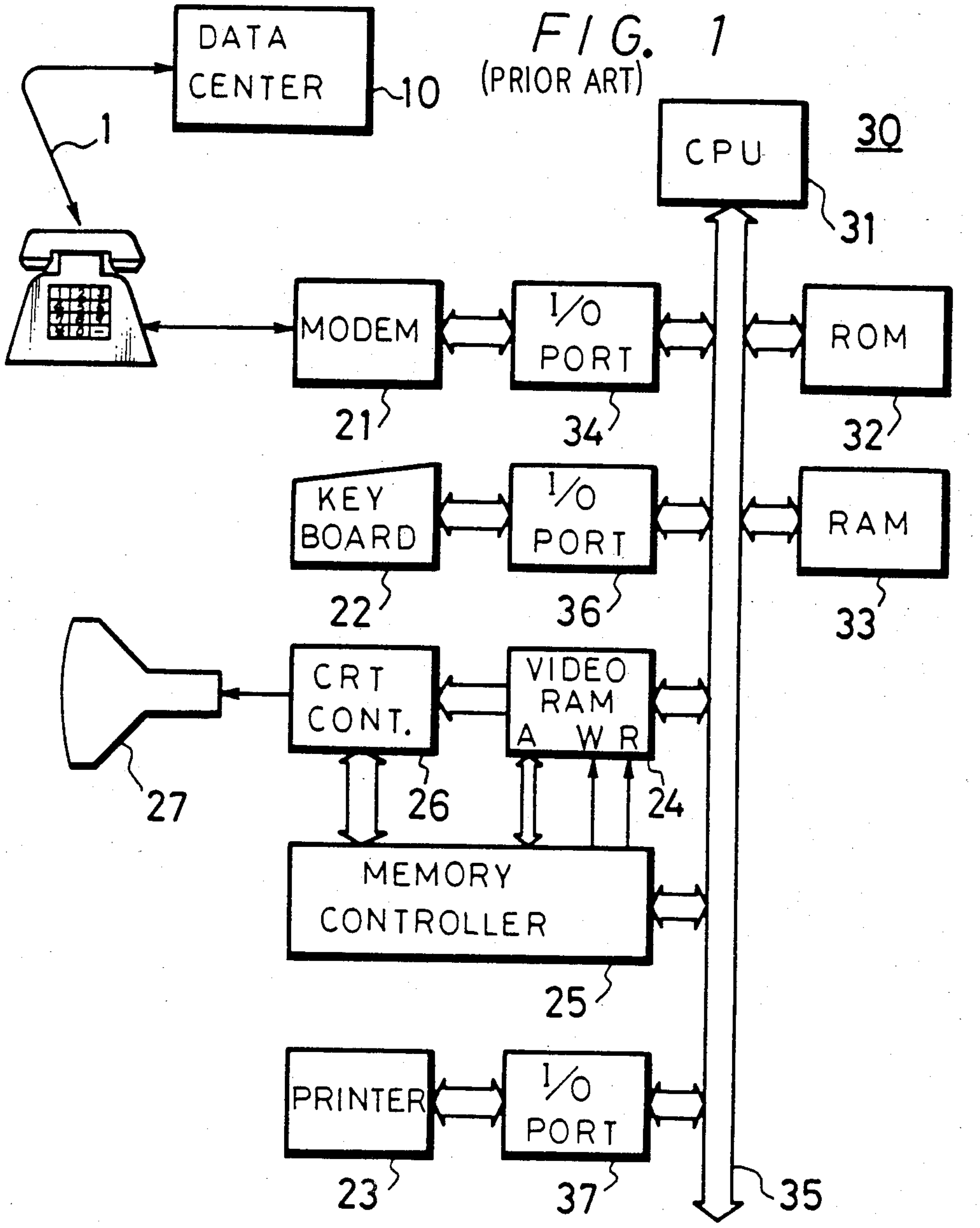
FIG. 1 (PRIOR ART)
FIG. 1 is a block diagram showing an example of a prior art character-image information system to which the present invention is applied.
Figure 5:
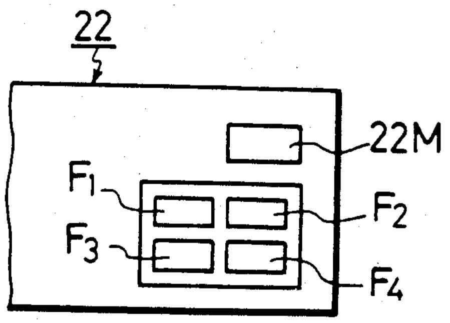
FIG. 5 is a diagram showing a part of an example of a keyboard used in an embodiment of a display terminal control system according to the present invention.
Figure 2:
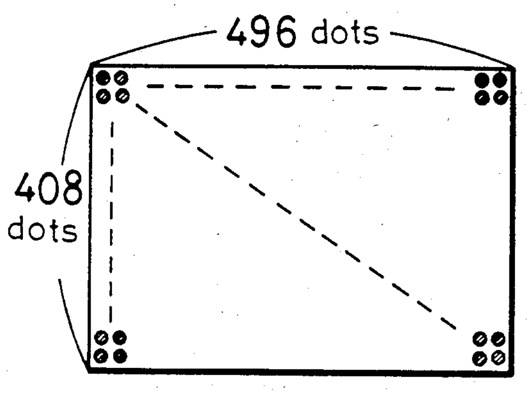
FIG. 2 (PRIOR ART)
FIGS. 2, 3 and 4 are respectively diagrams useful for explaining the character-image information system shown in FIG. 1.
Figure 3:
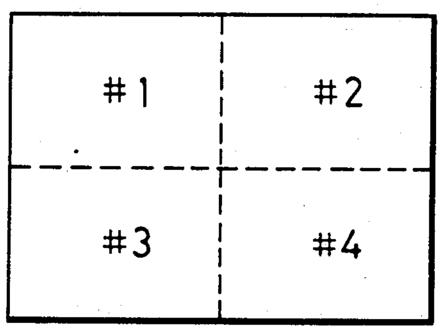
FIG. 3 (PRIOR ART)
Figure 4:
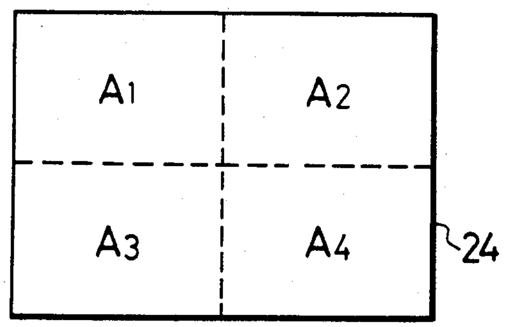
FIG. 4 (PRIOR ART)

FIG. 5 shows a part of the keyboard 22 used in the display terminal control system of this invention. Referring to FIG. 5, the keyboard 22 is provided with 4 image frame fix keys $F_1$ to $F_4$.

Reference numeral 22M designates a multi-image request key. When this key 22M is depressed, the user terminal is placed in the terminal oriented multi-image mode. Of course, the user terminal 30 is set in the multi-image mode when the data of multi-image mode is transmitted from the data center 10. In such case, regardless of this key 22M, in accordance with the request of the data center 10, the user terminal 30 is placed in the center-oriented multi-image mode.

In the terminal-oriented multi-image mode, a desired small picture frame can be fixed as follows.

Figure 6:
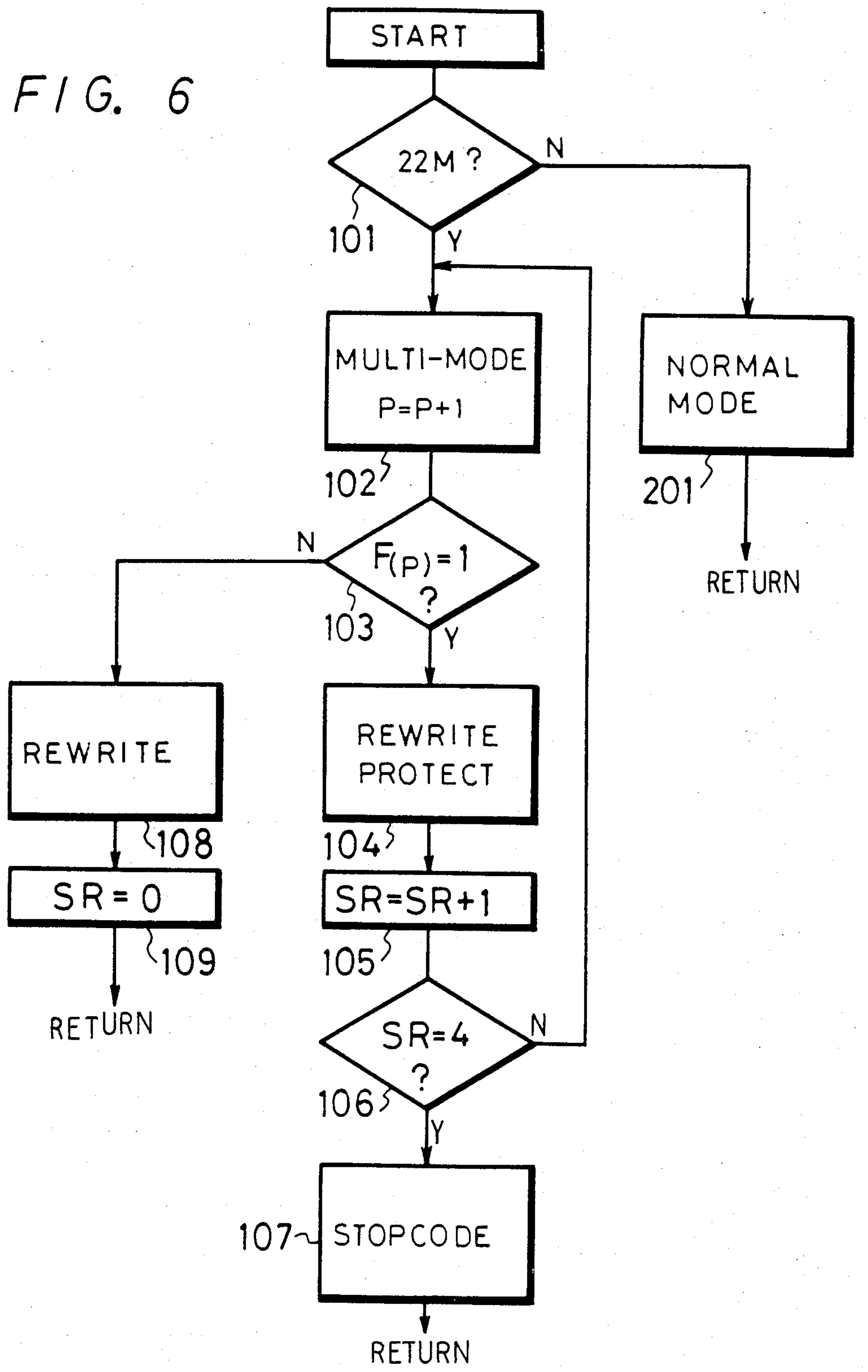
FIG. 6 is a flow chart useful for explaining the operation of the main part of the embodiment of the display terminal control system according to this invention.

FIG. 6 is a flow chart of a control program taken in steps for fixing the desired small picture frame and such small picture frame can be fixed on the basis of this program.

Firstly, in step 101, the depression of the key 22M is detected.

If the key 22M is not depressed, the user terminal 30 is put into the normal mode in which the image data of a single picture frame with respect to one page is written in the video RAM 24 (at step 201). If, on the other hand, the key 22M is depressed, an area pointer P is set for the memory areas $A_1$ to $A_4$ corresponding to the respective small picture frames #1 to #4 of the video RAM 24 (at step 102). At first, the pointer P is set to "1", and the depression of the fix key Fi for the area Ai is checked at step 103. This is decided by a flag F(i), because when the fix key Fi corresponding to the area Ai of pointer P (P=i, i=1, 2, 3 or 4) is depressed, the flag F(i) becomes "1" otherwise "0". Accordingly, if the key $F_1$ is depressed, F(i)="1" is established so that this state is judged and the image data is prohibited from being written in the video RAM 24 at its address in which the image data of the area $A_1$ is stored (at step 104). Then, "1" is added to a data SR which indicates the number of the fixed small picture frames and then stored in a search register (work area of the RAM 33) in step 105. Whether the data SR indicative of the content or data stored in the search register is "4" or not, or whether all the 4 small picture frames #1 to #4 are fixed or not is judged (at step 106). If SR=4, the pointer P is set for the memory area $A_2$ of the next small picture frame #2, or P=2 is established. If the corresponding fix key $F_2$ is not depressed, F(2)="0" is established so that this state is judged at step 103. Then, the image data from the data center 10 is written in the memory area $A_2$ (at step 108). That is, the memory area $A_1$ is skipped and the image data is written in the memory area $A_2$. As described above, when the small picture frame is not fixed and the memory area in which the image data from the data center 10 can be stored exists, the content or data SR of the search register is reset (SR=0) in step 109 and the routine is returned to main program.

If, on the other hand, the frame kix keys $F_1$ to $F_4$ are all depressed and all of the 4 small picture frames are fixed, the routine from steps 102 to 106 is repeated. If SR=4 is judged in step 106, from the user terminal 30, a stop code is generated at step 107.

As described above, if the frame fix key is depressed, the image data is prohibited from being written in the corresponding address area of the memory and hence the image data produced when the frame fix key is depressed is displayed as the small picutre frame in the fixed state. In addition, although the data is prohibited from being written in the memory area, the image data, which is to be written in the prohibited memory area, is written in the memory area corresponding to the small picture frame whose frame fix key is not depressed so that the image data transmitted from the data center 10 can be prevented from becoming useless.

While in the above-mentioned embodiment the present invention is applied to the CAPTAIN system, it is needless to say that this invention can be applied to a television multiplex-character broadcast. In this case, however, the communication is the unidirectional communication from the broadcasting station so that when the divided small picture frames are all fixed, the character-image data transmitted becomes useless.

According to this invention,as set forth above, in the multi-image mode, the user can watch the desired small picture frame in a fixed state. Accordingly, in the multi-image mode, if the information of a particular one picture of a particular small picture frame is very important for the viewer, such picture frame can be fixed and thence the display terminal control system of this invention is very advantageous in use.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. A display terminal control system for an image information terminal comprising:

system control means;

display control means connected to said system control means and having a display buffer memory, said system control means managing the operation of said display buffer means;

coupling means connected to said system control means for connecting said image information terminal to a data center;

said display buffer memory comprising plural memory locations for storing successively arriving blocks of data corresponding to pictorial images by overwriting data previously stored therein;

a keyboard connected to said system control means; and means connected to and responsive to said keyboard for causing successively arriving data blocks to be stored in less than all of said memory locations, whereby at least one memory location selectively stores data which is not overwritten by said arriving blocks of data, whereby selective operation of said keyboard enables a multi-image display having at least a fixed portion thereof corresponding ot one of said successively arriving blocks of data.

2. The display terminal control system as cited in claim 1, wherein when said multi-image control key is depressed, a plurality of pages of display are stored in separate areas of said display buffer memory.

3. The display terminal control system as cited in claim 2, wherein said keyboard has fix keys which function to select one of said memory areas to be unchanged.

4. The display terminal control system as claimed in claim 3, wherein said display buffer memory is divided into four sections and including means for storing, in each of said respective sections, modified image data corresponding to said normal image data in reduced size.

5. The display terminal control system as cited in claim 4, wherein said keyboard has 4 fix keys corresponding to said 4 sections of said display buffer memory.

6. The display terminal control system as cited in claim 5, wherein said 4 sections of the display buffer memory are rewritten by said modified image data in a predetermined order.

7. The display terminal control system as claimed in claim 6, wherein said fix means is depressed, overwriting of the data stored in the corresponding buffer memory sections is prohibited.

* * * * *